(12) United States Patent
Johnson

(10) Patent No.: US 7,506,350 B2
(45) Date of Patent: Mar. 17, 2009

(54) SYSTEM AND METHOD FOR SIMPLIFYING DIFFERENT TYPES OF SEARCHES IN ELECTRONIC PROGRAM GUIDE

(75) Inventor: Carolynn Rae Johnson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 699 days.

(21) Appl. No.: 10/468,559

(22) PCT Filed: Feb. 28, 2002

(86) PCT No.: PCT/US02/06307

§ 371 (c)(1), (2), (4) Date: Aug. 21, 2003

(87) PCT Pub. No.: WO02/069629

PCT Pub. Date: Sep. 6, 2002

(65) Prior Publication Data
US 2004/0078816 A1 Apr. 22, 2004

Related U.S. Application Data

(60) Provisional application No. 60/272,215, filed on Feb. 28, 2001.

(51) Int. Cl.
*H04N 5/455* (2006.01)
*G06F 13/00* (2006.01)
*G06F 17/30* (2006.01)

(52) U.S. Cl. .............................. 725/53; 725/39; 725/52; 707/3

(58) Field of Classification Search ................... 725/39, 725/45, 46, 52–53; 707/3
See application file for complete search history.

(56) References Cited

U.S. PATENT DOCUMENTS

| | | | |
|---|---|---|---|
| 5,485,197 A * | 1/1996 | Hoarty | 725/37 |
| 5,557,316 A | 9/1996 | Hoarty et al. | |
| 5,629,733 A | 5/1997 | Youman et al. | |
| 5,671,411 A | 9/1997 | Watts et al. | |
| 5,686,954 A * | 11/1997 | Yoshinobu et al. | 725/43 |

(Continued)

FOREIGN PATENT DOCUMENTS

EP 0 774 868 A1 5/1997

(Continued)

OTHER PUBLICATIONS

International Preliminary Examination Report for PCT Appln. No. PCT/US02/06307 dated Dec. 18, 2003.

*Primary Examiner*—Son P Huynh
(74) *Attorney, Agent, or Firm*—Robert D. Shedd; Joseph J. Opalach; Reitseng Lin

(57) ABSTRACT

A system and a method for processing program guide information are presented. Electronic program guide information is received and stored. A first search criterion from a user for a first type of search is received. The program guide information is searched to find one or more records matching the first type of search. A user instruction is received to convert the first search criterion to a second search criterion for use with a second type of search. The first search criterion is converted for use with the second type of search.

20 Claims, 10 Drawing Sheets

U.S. PATENT DOCUMENTS

| | | | |
|---|---|---|---|
| 5,790,115 A * | 8/1998 | Pleyer et al. | 715/716 |
| 5,798,785 A | 8/1998 | Hendricks et al. | |
| 5,812,124 A * | 9/1998 | Eick et al. | 725/45 |
| 5,848,410 A * | 12/1998 | Walls et al. | 707/4 |
| 5,850,218 A * | 12/1998 | LaJoie et al. | 725/45 |
| 5,880,768 A * | 3/1999 | Lemmons et al. | 725/41 |
| 5,912,664 A | 6/1999 | Eick et al. | |
| 6,005,565 A * | 12/1999 | Legall et al. | 715/721 |
| 6,005,631 A | 12/1999 | Anderson et al. | |
| 6,195,692 B1 | 2/2001 | Hsu | 709/219 |
| 6,216,264 B1 * | 4/2001 | Maze et al. | 725/53 |
| 6,516,329 B1 * | 2/2003 | Smith | 715/501.1 |
| 6,545,722 B1 * | 4/2003 | Schultheiss et al. | 348/552 |
| 6,601,238 B2 * | 7/2003 | Morrison et al. | 725/50 |
| 6,766,526 B1 * | 7/2004 | Ellis | 725/57 |
| 6,865,746 B1 * | 3/2005 | Herrington et al. | 725/53 |
| 6,961,954 B1 * | 11/2005 | Maybury et al. | 725/53 |
| 7,165,098 B1 * | 1/2007 | Boyer et al. | 709/219 |
| 7,213,256 B1 * | 5/2007 | Kikinis | 725/53 |
| 7,228,556 B2 * | 6/2007 | Beach et al. | 725/53 |
| 7,346,605 B1 * | 3/2008 | Hepworth et al. | 707/3 |
| 2002/0194151 A1 * | 12/2002 | Fenton et al. | 707/1 |
| 2003/0066085 A1 * | 4/2003 | Boyer et al. | 725/104 |
| 2005/0204387 A1 * | 9/2005 | Knudson et al. | 725/52 |

FOREIGN PATENT DOCUMENTS

| | | |
|---|---|---|
| WO | 00/28733 | 5/2000 |
| WO | WO 01/78383 A2 * | 10/2001 |

* cited by examiner

FIG. 4

| 7/22 | 5:00PM | 5:30PM | 6:00PM | 6:30PM |
|---|---|---|---|---|
| 202 CNN | WORLDVIEW | | MONEYLINE | CROSSFIRE |
| 206 ESPN | UP CLOSE | SPORTSCENTER | ESPN.com | UP CLOSE |
| 213 HSN | GARDEN... | HOME FU... | BUYER'S M... | SHOWCASE |
| 253 USA | RENEGADE | | WINGS | WINGS |
| 275 CNBC | BUSINESS... | BUSINESS... | MONEY CL... | FOUR WE... |
| 910 HBO | APOLLO 13 | | COUNTDO... | HOLLYWO... |
| 966 MTV | SINGLED OUT | TOP 10 VIDEO | | BEAVIS &... |

PROGRAM GUIDE   TUESDAY 7/22/97   5:09PM
FOUR WEDDINGS AND A FUNERAL   FAMILY   INTERNET E-MAIL

EXIT | ? | | | ▷ | | 596 | 597 | 598 | MENU
590 591 592 593 594 595 596 597 598 599
         ALPHA   MORE    SCOUT
         SORT    DETAILS SEARCH

SYSTEM AND METHOD FOR SIMPLIFYING DIFFERENT TYPES OF SEARCHES IN ELECTRONIC PROGRAM GUIDE

This application claims the benefit, under 35 U.S.C. § 365 of International Application PCT/US02/06307, filed Feb. 28, 2002, which was published in accordance with PCT Article 21(2) on Sep. 6, 2002 in English and which claims the benefit of United States patent application No. 60/272,215, filed Feb. 28, 2001.

FIELD OF THE INVENTION

This invention relates to the field of program guide data processing in general and, in particular, to searching electronic program guide data.

BACKGROUND OF THE INVENTION

Due to the advent of cable television, direct satellite systems, and other television program broadcast systems, television viewers have very large numbers of programs from which to select. Sophisticated systems have been developed to assist a viewer in selecting programs to view or record. One such system is an Electronic Program Guide (EPG).

An EPG is an interactive, on screen equivalent to TV listings found in local newspapers or other print media. An EPG can provide up to 20 different kinds of information about each program that is within the time frame covered by the EPG. The time frame typically ranges from the next hour up to seven days in advance. The information contained in an EPG includes program identification information such as, program title, start time, end time, time remaining, topic, theme, actors, writer, production studio, awards, keywords, release date, director, and a brief description. EPG program information is usually displayed in a two-dimensional table or grid format with time on one axis and channel number on the other axis.

Unlike non-interactive guides that reside on a dedicated channel and merely scroll through the current programming on other channels, EPGs allow viewers to select any channel at any time within the EPG's time range. Further EPG features include the ability to highlight individual cells of the grid containing program information. Once highlighted the viewer can perform functions pertaining to that highlighted program. For instance, the viewer could instantly switch to that program if it is currently being aired. Viewers could also program one touch video cassette recording (VCR) or the like if the television is properly configured and connected to a recording device. Such EPGs are known in the art and are described, for instance, in U.S. Pat. Nos. 5,353,121, 5,479,268, and 5,479,266.

U.S. Pat. No. 5,515,106, Chaney, describes a data packet structure which may be used to implement an EPG system. The data packet structure is designed so that both the channel information (e.g., channel name, call letters, channel number, type, etc.) and the program identification information (e.g., content, title, rating, star, etc.) relating to a program may be transmitted from a program guide database provider to a receiving apparatus such as a television efficiently.

In a system capable of displaying an EPG, an electronic host device stores records corresponding to each upcoming television program within the EPG's time frame. Each record contains program identification data that is unique to a particular upcoming television program. Program identification data includes at least one of program title, start time, end time, time remaining, topic, theme, actors, writer, production studio, awards, keywords, release date, director, and a brief description. Moreover, each record comprises a plurality of program identification fields, including at least one field for topic, theme, description, title, actors, roles, director, writer, production studio, awards, keywords, or release date. The records are adapted so that the program identification data is separated and placed into a corresponding program identification field upon being stored. The records are updated periodically by both deleting records of programs that have previously aired and adding new records of upcoming programs that fall within the EPG's time frame as time passes. The content of an EPG at any one time consists of those records that are currently stored by the electronic host device at that time. An EPG is displayed on a display module, such as a television, that is associated with the electronic host device.

EPG systems often store a large number of records for upcoming programs, facilitating an EPG to display a television programming schedule that covers a significant period of time. As such, an EPG can be used to find upcoming programs that may be of interest to a user days in advance of the program being aired. Thus, a need exists for a user to be able to search an EPG for upcoming programs that match a user's interests.

These searching mechanisms may comprise a continuous searching mechanism or a non-continuous searching mechanism. Non-continuous searching mechanisms, when activated, perform a one-time search of the records based on a user selected search criterion. On the other hand, a continuous searching mechanism, when activated, performs ongoing, repetitive searches of the records based on a user selected search criterion.

For example, a user may conduct an alphabetical search (e.g., "AlphaSort search") so that the system is programmed to search for programs having the user composed text string in the title of the program and then display the result in an alphabetical order. In one embodiment, the system conducts a one time, alphabetical search of the "title fields" of the currently stored EPG records. If the title field of a record has data that matches the user composed text string, that record will be delineated as a "match." Once all of the records are searched, the upcoming programs whose records were delineated as matches are displayed in an alphabetized form in a user interface display. A user can then highlight a cell on the user interface that corresponds to an upcoming program and perform certain functions pertaining to that upcoming program.

One such function that can be performed by highlighting a program cell is the More Details feature. However, the More Details option is not limited to program cells resulting from an AlphaSort search. The More Details operation can be performed on any highlighted program cell, such as a program cell in an EPG menu. The More Details operation is activated by highlighting and selecting a particular program cell or by selecting a More Details button or icon located in a channel banner. Once activated, an interface is displayed that contains program identification information relating to the selected program, such as actors, roles, director, writer, production studio, etc. A user can then perform a More Details search by selecting a cell that contains particular program identification information. For example, suppose a user selected a cell in the More Details interface that contained a particular actor's name. By highlighting that cell and activating a search, a one-time search of the currently stored records is conducted using the actor's name as the search criteria. Records that contain data corresponding to the actor's name in the actor field are delineated as matching records. The upcoming programs corresponding to the matching records are then displayed in list form in a More Details search results interface.

Another example of another search is a "Scout" search which may, for example, searches a user-entered text in the EPG data, and display any matched programs, without regards as to whether the found results are alphabetized. In addition, this type of search is typically implemented as a continuous search such that as new EPG data are received overtime, the same search criteria will be applied automatically to update the search result.

If a user conducts a search such as AlphaSort or More Details and subsequently decides that he or she wishes to perform a different type of search such as Scout, using the same search criteria, he or she would normally be required to exit the first type of search, be it AlphaSort or More Details, thereby losing the desired search criteria. The user must then access the second type of search and reenter the desired search criteria a second time. Thus, without a means to specifically instruct the system to convert a first-type search criterion into second-type search criterion, the user is forced to enter redundant information. This is a waste of the user's time and effort.

SUMMARY OF THE INVENTION

This problem and others are solved by the present invention. Therefore, a system and a method for processing program guide information are presented. Electronic program guide information is received and stored. A first search criterion from a user for a first type of search is received. The program guide information is searched to find one or more records matching the first type of search. A user instruction is received to convert the first search criterion to a second search criterion for use with a second type of search. The first search criterion is converted for use with the second type of search.

The first type of search may be a non-continuous search and the second type of search may be a continuous search. The non-continuous search may be an alphabetical sort (e.g., "AlphaSort") search or a More Details search. The continuous search may be a "Scout" search, for example.

Optionally, the method comprises modifying the second type search criterion. Preferably, the method comprises saving the second type search criterion and repetitively performing new searches based on the saved second type search criterion. The repetitive new searches can be conducted either automatically upon receipt of updated program guide information or upon user command.

Preferably, the electronic program guide information comprises periodically updated records, wherein each record comprises a matrix of program identification fields relating a program's identification information to a corresponding data field, including at least one of topic, theme, actor, title, director, awards, production studio, release date, roles, description, and keywords.

The first-type search criterion can be a user selected text string and user selected program identification fields. Preferably, the user selected program identification fields include at least one field of topic, theme, actors, title, description, roles, director, writer, production studio, awards, keywords, and release date. Also preferably, the user selected text string is either composed by the user or delineated as the text within a user interface cell by the user.

In another aspect, the invention is an apparatus for assisting a user in selecting a television program for viewing or recording comprising means for periodically receiving and storing electronic program guide information; means for sorting the electronic program guide information according to user selected criterion; user control means for selecting criterion for a first-type search; means for performing the first type search and displaying a list of programs corresponding to one or more records meeting the first-type search criterion; means for converting the first-type search criterion into second type search criterion; and means for performing the second-type search of the electronic program guide information based on the second-type search criteria.

BRIEF DESCRIPTION OF THE DRAWINGS

FIG. 4 is a display module having a diagrammatic representation of an electronic program guide (EPG).

DETAIL OF THE INVENTION

Figure 1:
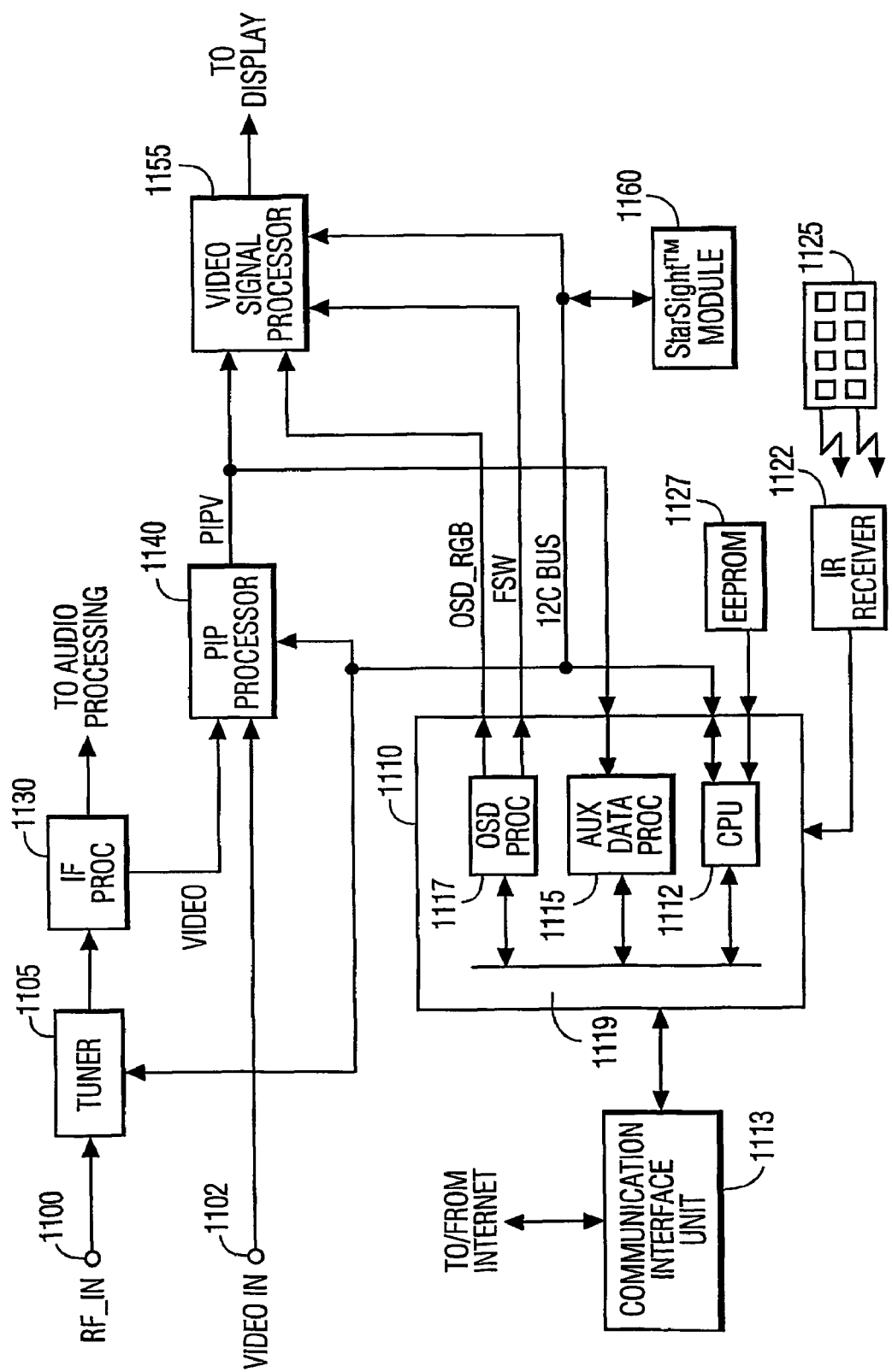
FIG. 1 is a schematic of an apparatus capable of processing user commands and displaying user interface screens in accordance with the present invention.

FIG. 1 is a schematic of an apparatus capable of processing user commands, displaying the user interface screens of FIGS. 4-10, and performing searches of stored program guide records in accordance with the present invention. The apparatus is capable of processing both analog NTSC television signals and internet information. The apparatus of FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operates in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor (mP) 1110 for controlling components of the television receiver such as tuner 1105, picture-in-picture processing unit 1140, video signal processor 1155, and StarSight™ data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within mP 1110 executes control programs contained within memory, such as EEPROM 1127 shown in FIG. 1, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Another example of a control program stored in EEPROM 1127 is software for implementing the operations shown in FIGS. 4-9, and 10 (in flow chart form) in accordance with the present invention as to be described below.

Main microprocessor 1110 also controls the operation of a communications interface unit 1113 for providing the capability to upload and download information to and from the internet. Communication interface unit 1113 includes, for example, a modem for connecting to an internet service provider, e.g., via a telephone line or via a cable television line. The communication capability allows the system shown in FIG. 1 to provide email capability and internet-related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight™ data from video signal PIPV.

StarSight™ data which provides program guide data information in a known format is typically received only on a particular television channel and the television receiver must tune that channel to extract StarSight™ data. To prevent StarSight™ data extraction from interfering with normal use of the television receiver, CPU 1112 initiates StarSight™ data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight™ data. CPU 1112 controls the transfer of extracted StarSight™ data from decoder 1115 via I²C BUS to StarSight™ module 1160. A processor internal to the module formats and stores the data in memory within the module. In response to the StarSight™ EPG display being activated (e.g., a user activating a particular key on remote control 125), CPU 1112 transfers formatted StarSight™ EPG display data from StarSight™ module 1160 via I²C BUS to OSD processor 1117.

OSD processor 1117 operates in a conventional manner to produce R, G, and B video signals OSD_RGB that, when coupled to a displayed device (not shown), will produce a displayed image representing on-screen display information in according to FIGS. 4-10 to be described later. OSD processor 1117 also produces control signal Fast-Switch (FSW) which is intended to control a fast switch for inserting signals OSD_RGB into the systems video output signal at times when an on-screen display is to be displayed. Therefore, when a user enables the various user interface screens of the present invention to be described later, OSD processor 1117 produces the corresponding signals OSD_RGB representing the on-screen display information previously stored or programmed in the memory 1127. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

As mentioned above, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight™ module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes an EPG control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The process and displaying of a program guide in accordance with the present invention may be implemented using a combination of software and hardware. For example, referring to FIG. 1, display of an EPG may be implemented by software in memory such as EEPROM 1127. Activation of an EPG, e.g., by a user pressing an EPG related button on remote control 1125, causes CPU 1112 to execute the EPG software routine. As part of generating an EPG display, CPU 1112 also accesses EPG data and graphics that may be stored in StarSight™ module 1160 via the 12C bus. Under control of the EPG software routine stored in EEPROM 1127, CPU 11-12 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples in the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 1 that have been described thus far comprises an ST9296 microprocessor produced by SGS-Thornson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 2:
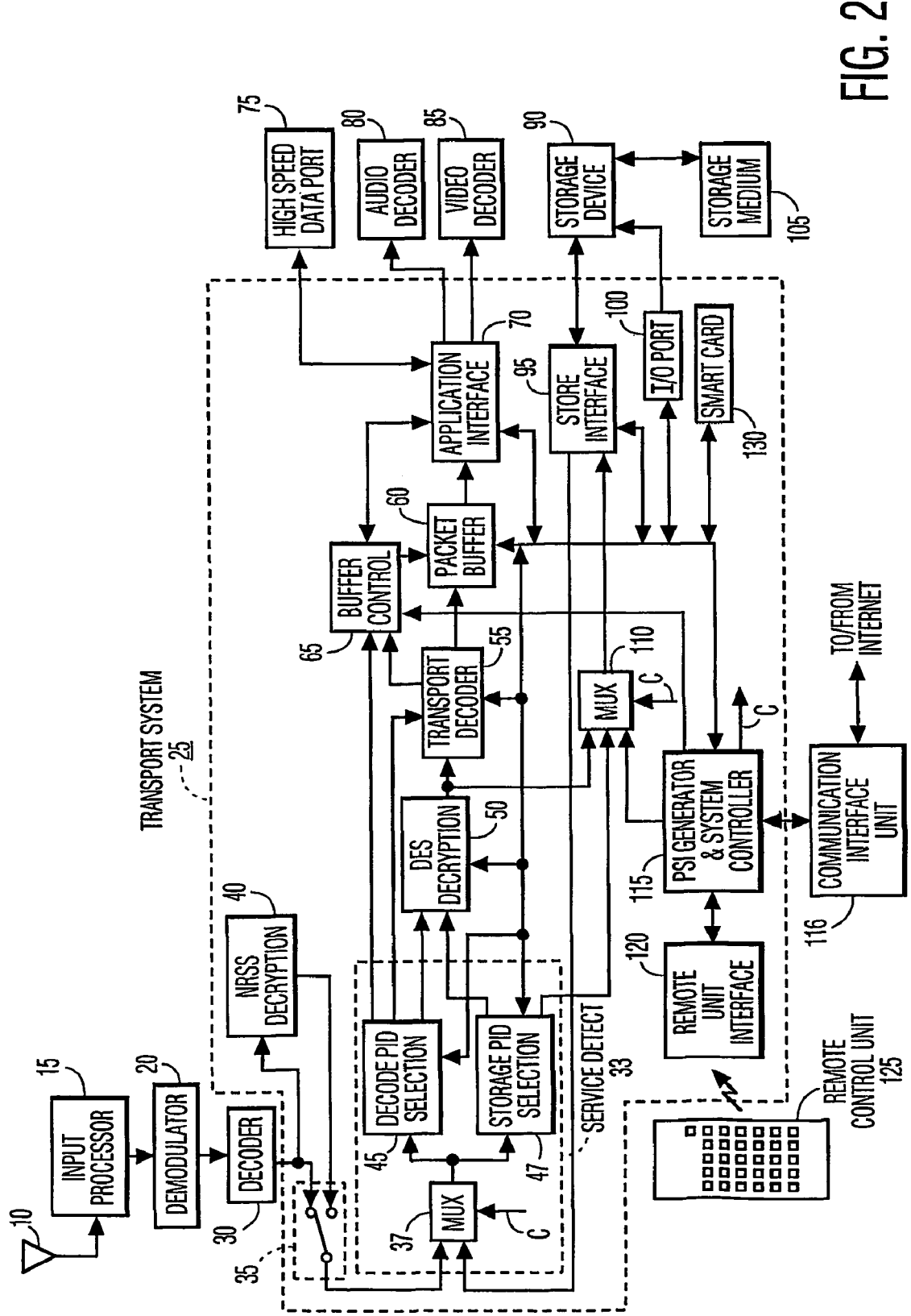
FIG. 2 is a schematic of a digital video processing apparatus suitable for processing user commands and displaying user interface screens in accordance with the present invention.

FIG. 2 shows another example of an apparatus capable of processing user commands, displaying the user interface screens of FIGS. 4-9, and performing searches of stored program guide records in accordance with the present invention. As described below, the apparatus shown in FIG. 2 is an MPEG compatible system for receiving MPEG encoded transport streams representing broadcast programs. However, the system shown in FIG. 2 is exemplary only. The user interface system described herein is also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV." Further, although the system described below is described as processing broadcast programs, this is exemplary only. The term "program" is used to represent any form of packetized data such as telephone messages, computer programs, internet data or other communications, for example.

In overview, in the video receiver system of FIG. 2, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

In FIG. 2, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an internet service provider via the communication interface unit 116. The individual packets that comprise either particular program channel content or Program Guide information, are identified by their Packet Identifiers (PIDs) contained within header information. As discussed above, the program description contained in the program guide information may comprise different program descriptive fields such as title, star, rating, etc., relating to a program.

The user interface incorporated in the video receiver shown in FIG. 2 enables a user to activate various features by selecting a desired feature from an on-screen display (OSD) menu. The OSD menu may include an electronic program guide (EPG) as described above, and other features discussed below.

Data representing information displayed in the OSD menu is generated by system controller 115 in response to stored on-screen display (OSD) information representing text/graphics, stored program guide information, and/or program guide and text/graphics information received via the input signal as described above and in accordance with exemplary control programs to be shown in FIGS. 4-10, and to be discussed below. The software control programs may be stored, for example, in embedded memory (not shown) of system controller 115.

Using remote control unit 125 (or other selection means such as a mouse) a user can select from the OSD menu items such as a program to be viewed, a program to be stored (e.g., recorded), the type of storage media and manner of storage. System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. The approach places all security related functions in a removable unit that can easily be replaced if a service provider decides to change encryption techniques or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input data stream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption technique such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above and as shown in FIG. 4, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 1. That is, unit 116 provides the capability to upload and download information to and from the internet. Communication interface unit 116 includes, for example, a modem for connecting to an internet service provider, e.g., via a telephone line or via a cable television line. The communication capability allows the system shown in FIG. 2 to provide email capability and internet related features such as web browsing in addition to receiving television programming.

Figure 3:
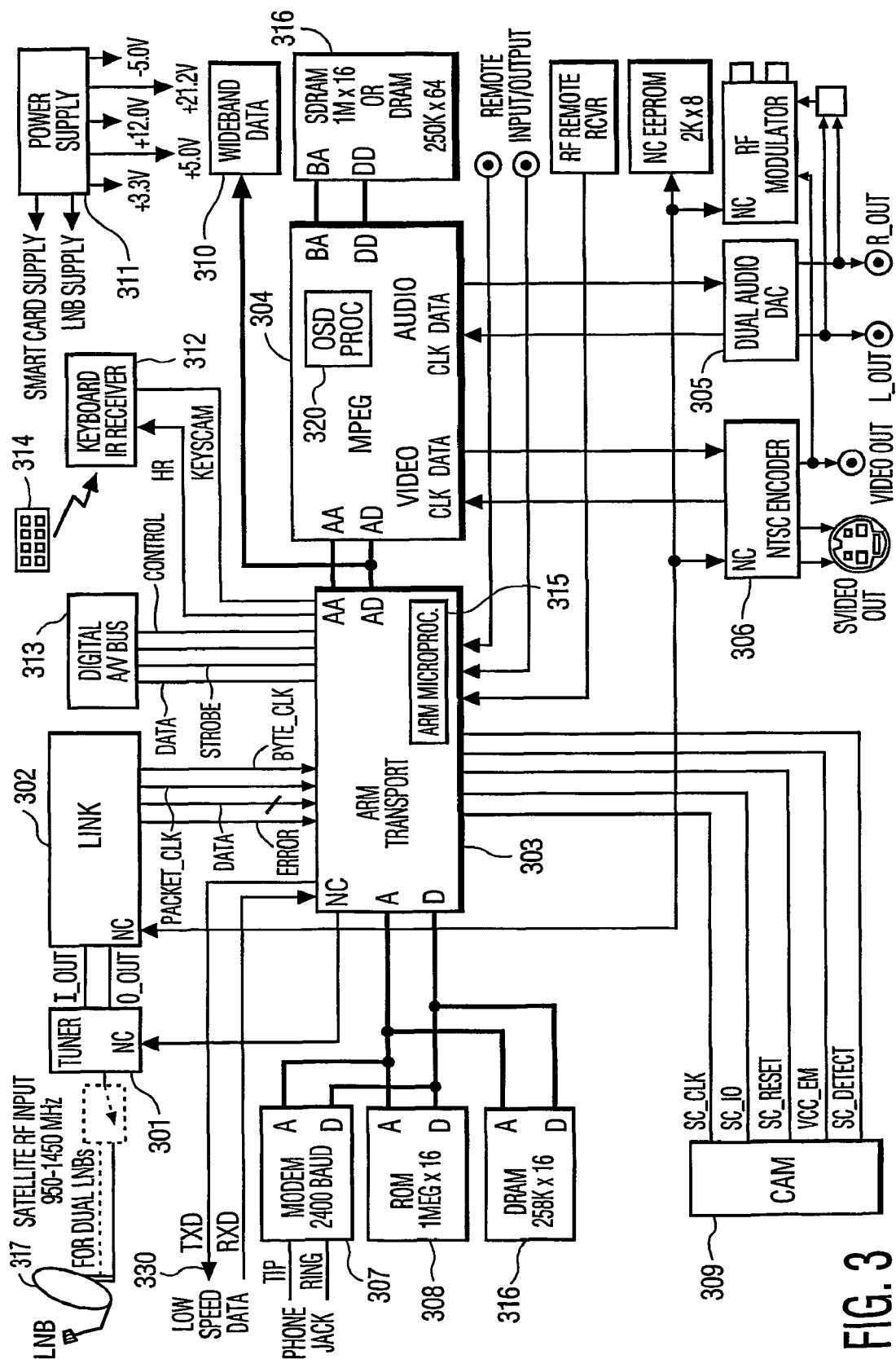
FIG. 3 is a schematic of a specific implementation of the apparatus generally shown in FIG. 2.

FIG. 3 is a specific implementation of an electronic device generally shown in FIG. 2 and described in detail above. FIG. 3 represents a satellite receiver set-top box, designed and manufactured by Thomson Consumer Electronics, of Indianapolis, Ind., USA, for receiving DIRECTV™ satellite service provided by Hughes Electronics.

As shown in FIG. 3, the set-top box has a tuner 301 which receives and tunes applicable satellite RF signals in the range of 950-1450 Mhz from a satellite antenna 317. The tuned analog signals are outputted to a link module 302 for further processing. Link module 302 is responsible for further processing of the analog tuned signals I_out and Q_out from tuner 301, including filtering and conditioning of the analog signals, and conversion of the analog signals into a digital output signal, DATA. The link module 302 is implemented as an integrated circuit (IC). The link module IC is manufactured by SGS-Thomson Microelectronics of Grenoble, France, and has Part No. ST 15339-610.

The digital output, DATA, from the link module 302 consists of compliant packetized data stream recognized and processable by the transport unit 303. The data stream, as discussed in detail in relation to FIG. 2, includes program guide data information and the data content of one or more program channels of the satellite broadcast service from DIRECTV™. As discussed above, program guide data contains information relating to the type of program (e.g., audio-only, video-only, etc.) as indicated, for example, by the "class" type.

The function of the transport unit 303 is the same as the transport system 25 shown in FIG. 2 and discussed already.

As described above, the transport unit 303, processes the packetized data stream according to the Packet Identifiers (PID) contained in the header information. The processed data stream is then formatted into MPEG compatible, compressed audio and video packets and coupled to a MPEG decoder 304 for further processing.

The transport unit 303 is controlled by an Advanced RISC Microprocessor (ARM 315 which is a RISC based microprocessor. The ARM processor 315 executes control software residing in ROM 308. Exemplary components of the software may be, for example, control programs shown in FIGS. 4-10 for processing user interface commands and displaying OSD information in accordance with aspects of the present invention as will be discussed below.

The transport unit 303 is typically implemented as an integrated circuit. For example, a preferred embodiment is an IC manufactured by SGS-Thomson Microelectronics and has a Part No. ST 15273-810 or 15103-65C.

The MPEG compatible, compressed audio and video packets from the transport unit 303 are delivered to a MPEG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound. The decoder 304 also outputs applicable digital video data which represents image pixel information to a NTSC encoder 306. The NTSC encoder 306 then further processes this video data into NTSC compatible analog video signal so that video images may be displayed on a regular NTSC television screen. The MPEG decoder as described above may be implemented as an integrated circuit. One exemplary embodiment may be an MPEG decoder IC manufactured by SGS-Thomson Microelectronics having Part No. ST 13520.

Included in the MPEG processor 304 is an OSD processor 320. The OSD processor 320 reads data from SDRAM 316 which contains stored OSD information. OSD information corresponds to bitmap OSD graphics/text images. The OSD processor is capable of varying the color and/or translucency of each pixel of an OSD image under the control of the ARM microprocessor 315 in a conventional manner.

The OSD processor is also responsible for generating an exemplary program guide as shown in FIG. 4 under the control of the ARM processor 315. In the exemplary embodiment, upon detecting a user request to generate a guide display, the ARM microprocessor 315 processes the program guide data information obtained from a data stream provided by a program guide information provider and formats the guide data information into OSD pixel data corresponding to a "grid guide" as shown in FIG. 4. The OSD pixel data from the transport unit 303 is then forwarded to OSD processor 320 in the MPEG audio/video decoder 304 for generating the guide image, as described before.

A low speed data port 330 is used to connect to an IR-Blaster (not shown) for controlling a VCR for recording a program. As discussed before, an IR blaster is basically a programmable VCR remote control emulator controlled by the satellite receiver shown in FIG. 3. It is positioned in front of a VCR remote sensor of an attached VCR and will transmit commands such as "ON" and "RECORD" under the control of the satellite receiver at the appropriate time, according to the timer screen information entered by the users.

Additional relevant functional blocks of FIG. 3 include modem 307 which corresponds to the communication interface unit 116 shown in FIG. 2 for access to the internet, for example. Conditional Access Module (CAM) 309, corresponds to the NRSS decryption unit 130 shown in FIG. 2 for providing conditional access information. Wideband data module 310 corresponds to High Speed Data Port 75 shown in FIG. 2 for providing high speed data access to, for example, a HDTV decoder or a computer. A keyboard/IR Receiver module 312 corresponds to Remote Unit interface 120 shown in FIG. 2 for receiving user control commands from a user control unit 314. Digital AV bus module 313 corresponds to I/O port 100 shown in FIG. 2 for connection to an external device such as a VCR or a DVD player.

Figure 10:
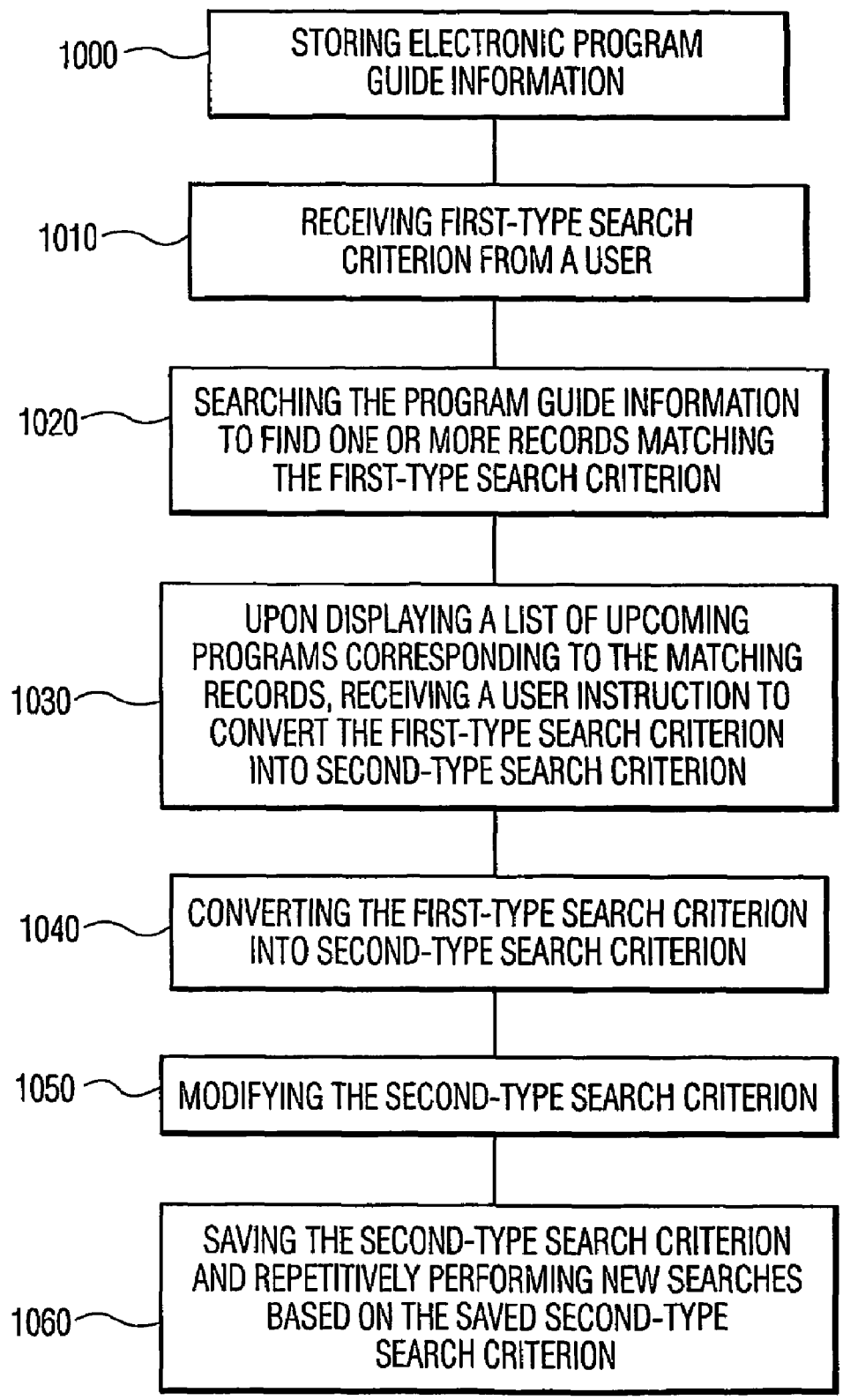
FIG. 10 is a flow chart of a method of converting first-type search criterion to second-type search criterion and performing a continuous search according to the present invention.

FIG. 10 is a high-level flow chart of an exemplary control program which according to the present invention, may be executed by any one of the apparatus shown in FIGS. 1-3, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., VCRs), satellite television and/or data signal converters, program guide receiving units, and the like, regardless of whether incorporated into a television receiver or personal computer or connected externally thereto. It will be appreciated that the process embodied in the exemplary control program may be implemented in hardware, software, or a combination thereof. A person skilled in the art would readily recognize from the flow chart and the following description that the control program when executed by any one of the systems described in FIGS. 1-3 or by other suitably programmed electronic host device will provide substantially the same feature and advantages in accordance with the present invention. Therefore, to avoid redundancy, the control program of FIG. 10 will be described below only with respect to the exemplary hardware implementation shown in FIG. 2.

In the illustrated embodiment, system controller 115 initially executes step 1000 of FIG. 10, periodically receiving and storing electronic program guide information. The electronic program guide information comprises records corresponding to upcoming programs and are stored in a local memory. Each upcoming program has a unique record associated with it. Moreover, each record contains program identification data for at least one of topic, theme, description, title, actors, roles, director, writer, production studio, awards, keywords, or release date. Each record further comprises a matrix of program identification fields, including at least one program identification field for topic, theme, description, title, actors, roles, director, writer, production studio, awards, keywords, or release date. The records are adapted so that the program identification data is separated and placed into a corresponding program identification field upon being stored. Moreover, the records are updated periodically.

Application interface 70, under the control of the system controller 115, generates an EPG menu as shown in FIG. 4. Preferably, the EPG menu is generated in response to the EPG display being activated (e.g., a user activating a particular key on remote control 125). In response to such activation, system controller 115 transfers EPG display data to application interface 70. Application interface 70 then outputs the corresponding display information to the video decoder for display on display module 11 (FIG. 4).

Referring to FIG. 4, EPG 500 typically occupies the entire display area of display module 11. EPG 500 shows a program schedule in a time-and-channel format, similar to a TV schedule listed in a newspaper. In particular, one dimension (e.g., horizontal) of the guide shows the time information while the other dimension (e.g., vertical) of the guide shows the channel information. The time information is conveyed to the user by having a time line 501 on the top portion of the guide and is demarked by half hour intervals. The channel information is conveyed to the user by channel numbers 510-516 and corresponding channel station names 520-526.

Figure 5:
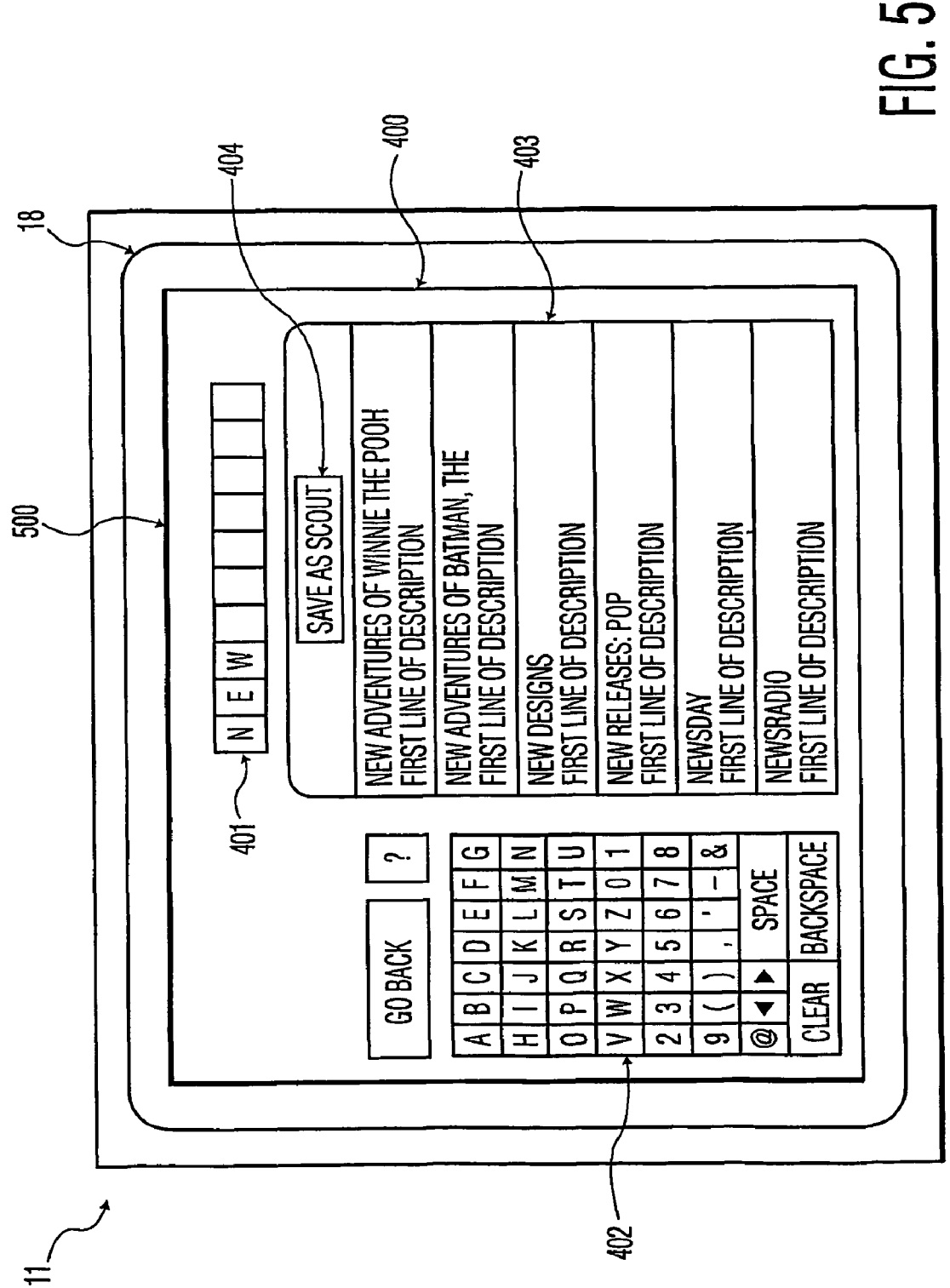
FIG. 5 is a display module having a diagrammatic representation of an AlphaSort search interface for performing a search of the EPG records according to the present invention.
Figure 6:
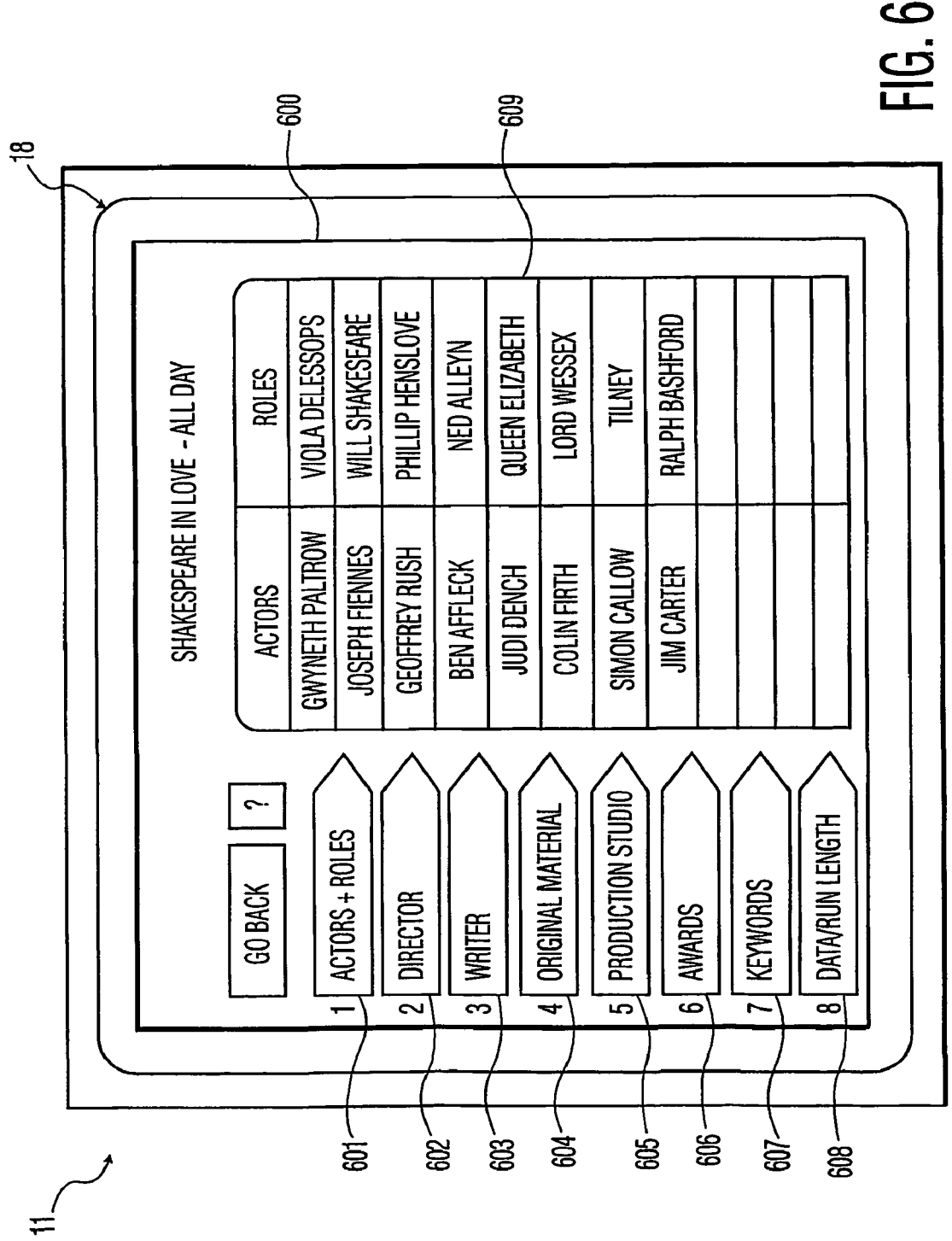
FIG. 6 is a display module having a diagrammatic representation of a More Details credits interface for displaying program identification information of a particular program according to the present invention.
Figure 8:
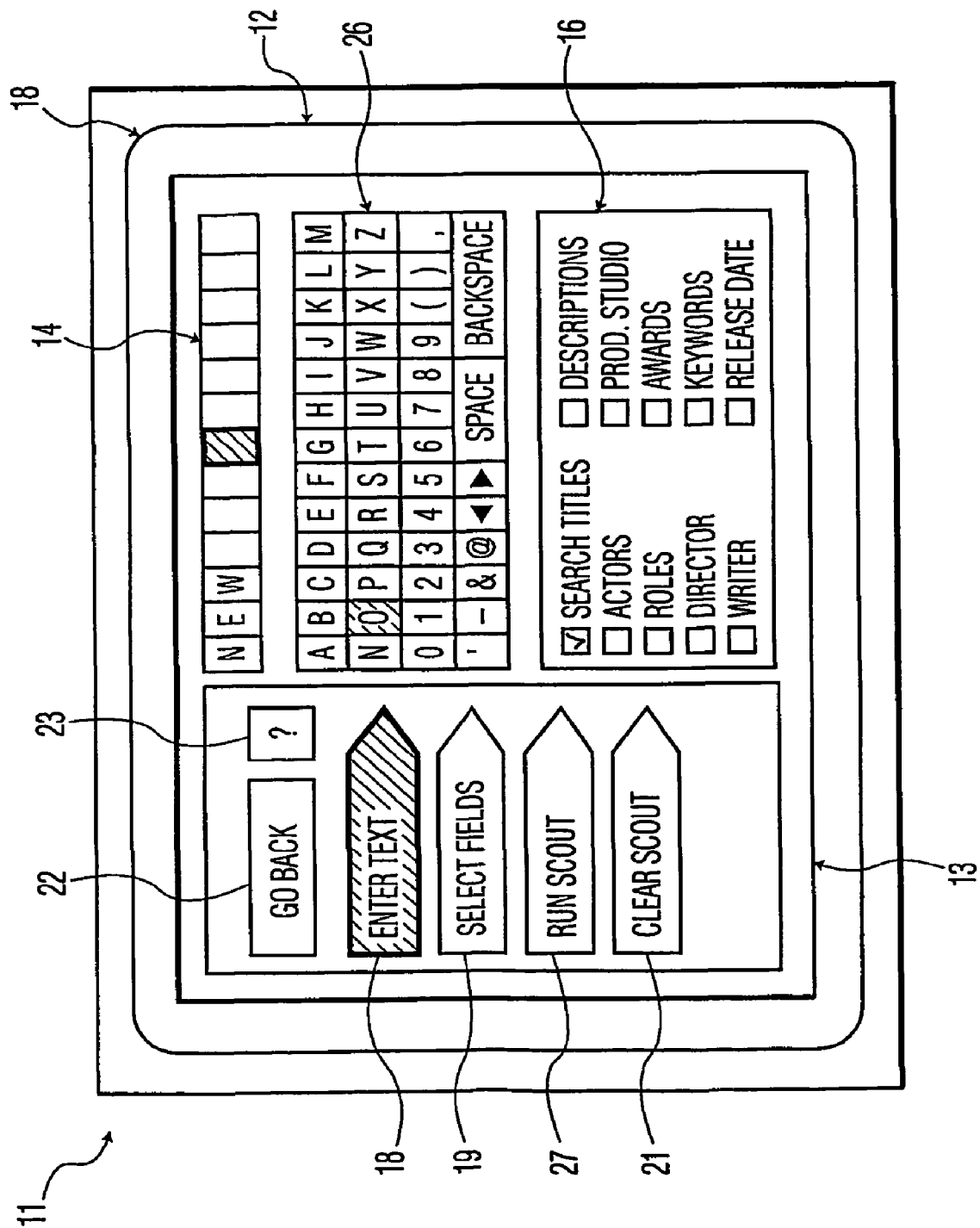
FIG. 8 is a display module having a diagrammatic representation of a Scout search interface for performing a search of the EPG records in accordance with the present invention.

In addition, EPG 500 contains icons 590-599. Icons 590-599 activate certain functions or features of the EPG system. System controller 115 monitors the location of a position indicator, such as a cursor and or highlighting, on the EPG menu display. A user controls the location of the position indicator using direction and selection keys of remote control 125 as described above. Alternatively, the user can use a mouse, keyboard, or a joystick. By highlighting and clicking one of the icons 590-599, a user will activate that function or feature or access a user interface associated therewith. Alternatively, a certain feature or function can be accessed through a separate menu (not shown). Of specific interest to the present invention are AlphaSort icon 596, More Details icon 597, and Scout Search icon 598. By highlighting and selecting AlphaSort icon 596, a user will access AlphaSort search interface 400 arranged according to the present invention as shown in FIG. 5. By highlighting and selecting More Details icon 597, a user will access More Details credit interface 600 arranged according to the present invention as shown in FIG. 6. By highlighting and selecting Scout Search icon 598, a user will access Scout search interface 12 arranged according to the present invention as shown in FIG. 8.

The following discussion of the present invention is conducted using the AlphaSort search as the first type of search and the Scout search as the second type of search. As such, in this embodiment, the present invention comprises converting AlphaSort search criterion to Scout search criterion. However, one skilled in the art will appreciate that the present invention can be implemented with respect to converting search criterion for various types of searches.

FIG. 5 illustrates display module 11 having a diagrammatic representation of AlphaSort search interface 400. AlphaSort search interface 400 facilitates step 1010 of FIG.; 10, receiving first-type search criterion from a user. As used herein, first-type search criterion comprises both a user selected text string and user selected program identification fields. AlphaSort search interface 400 comprises AlphaSort text string field 401, virtual keyboard 402, AlphaSort search results field 403, and "save as Scout" button 404. A user composes a user selected text string in AlphaSort text string field 401 by highlighting and selecting alphanumeric characters from virtual keyboard 402. When a user highlights and selects a specific character from virtual keyboard 402 using remote control 125, that character appears in AlphaSort text string field 401. The user repeats this procedure until he or she has composed a desired text string in AlphaSort text string field 401. This is the user selected text string of the AlphaSort search criterion.

The user selected program identification field is automatically delineated by the user when he or she selects to perform an AlphaSort search. As discussed above, an AlphaSort search is inherently limited to the title fields of the EPG records. Because the user has chosen to perform an AlphaSort search, the user selected program identification field is the title field for this type of search.

Once the user has composed the user selected text string in AlphaSort text string field 401, the user facilitates step 1020 of FIG. 10, searching the program guide information to find one or more records matching the first-type search criterion, by entering a search command via remote control 125. When the user enters the search command, a one-time search of the currently stored EPG records is conducted (facilitated by system controller 115). EPG records that contain data matching the user selected text string in the user selected program identification field (i.e., the title field for the AlphaSort search) are delineated as "matches."

Alternatively, system controller 115 of the AlphaSort mechanism can be programmed so that a search of the records is performed automatically upon a character being entered into AlphaSort text string field 401 (no search command needs to be activated by the user). Upon the first character being entered, system controller 115 searches the title fields of the records automatically for data in which the entered character is the first letter of the program's title. These records are delineated as "matches." As the user enters additional characters, similar searches of the records are automatically performed when each character is entered by the user.

Upon completion of the AlphaSort search of the EPG records, step 1030 of FIG. 10 is facilitated. A list of the upcoming programs corresponding to the matching records is displayed in AlphaSort search results field 403. A user can then enter a command to convert the first-type search criterion (i.e., the user selected text string and selected program identification fields) into second-type search criterion via remote control 125 by highlighting and selecting "save as Scout" button 404.

When the user highlights and selects "save as Scout" button 404, the first-type search criterion (i.e., the AlphaSort search criterion) are transferred to Scout search interface 12 (FIG. 8). As such, step 1040 of FIG. 10, converting the first-type criterion into second-type search criterion, is completed as discussed below.

Before discussing the details of how the first-type search criterion of the AlphaSort search are converted into second-type search criterion for a Scout search, it is necessary to explain how an ordinary Scout search is conducted according to the present invention.

Referring to FIG. 8, a display module 11 having Scout search interface 12 for performing ongoing searches is illustrated. Scout search interface 12 comprises interface control field 13, Scout text string field 14, virtual keyboard 26, and field selection field 16. Interface control field 13 comprises enter text button 18, select field button 19, run Scout button 27, go back button 22, help button 23, and clear Scout button 21. When a user highlights and selects enter text button 18, a user can then use a cursor to highlight characters from virtual keyboard 26. Upon entering a select command into remote control 125, the highlighted character appears in Scout text string field 14. The user repeats this character selection until the user has composed a desired text string in Scout text string field 14. Upon completion, the characters contained in Scout text string field 14 comprise the Scout search text string.

Upon completing the composition of the Scout search text string, the user can then enter field selection field 16 by highlighting and selecting select field button 19. Field selection field 16 has a list of the program identification fields that the data in the records is divided into (e.g., titles, actors, roles, etc.). A user selects what field(s) of the records will be searched for data corresponding to the Scout search text string by highlighting and selecting one or more of the field names in field selection field 16. Once this is done a check appears next to the selected field name. A user can repeat this procedure for as many fields of the records that he wishes to be searched for the Scout search text string. The fields chosen by the user are the Scout search fields. The Scout search fields and the Scout search text string, together, make up the Scout search criterion (i.e., the second-type search criterion in this embodiment of the present invention).

Once the Scout search criterion is chosen, a user can perform a Scout search of the EPG records for data matching the Scout search criterion by highlighting and selecting run Scout button 27. The search is facilitated by system controller 115 (FIG. 2) which is programmed to search the records. System controller 115 is programmed to search the records so that only those records which contain the Scout search text string in one or more of the Scout search fields will be delineated as a matching record. The Scout search criterion is automatically saved in a local memory upon activating Scout and new searches are repetitively performed. The repetitive searches can be performed automatically by system controller 115 upon the receipt of updated records or upon a command from a user entered via remote control 125. The Scout search results are displayed in Scout search results interface 24 (FIG. 9).

Figure 9:
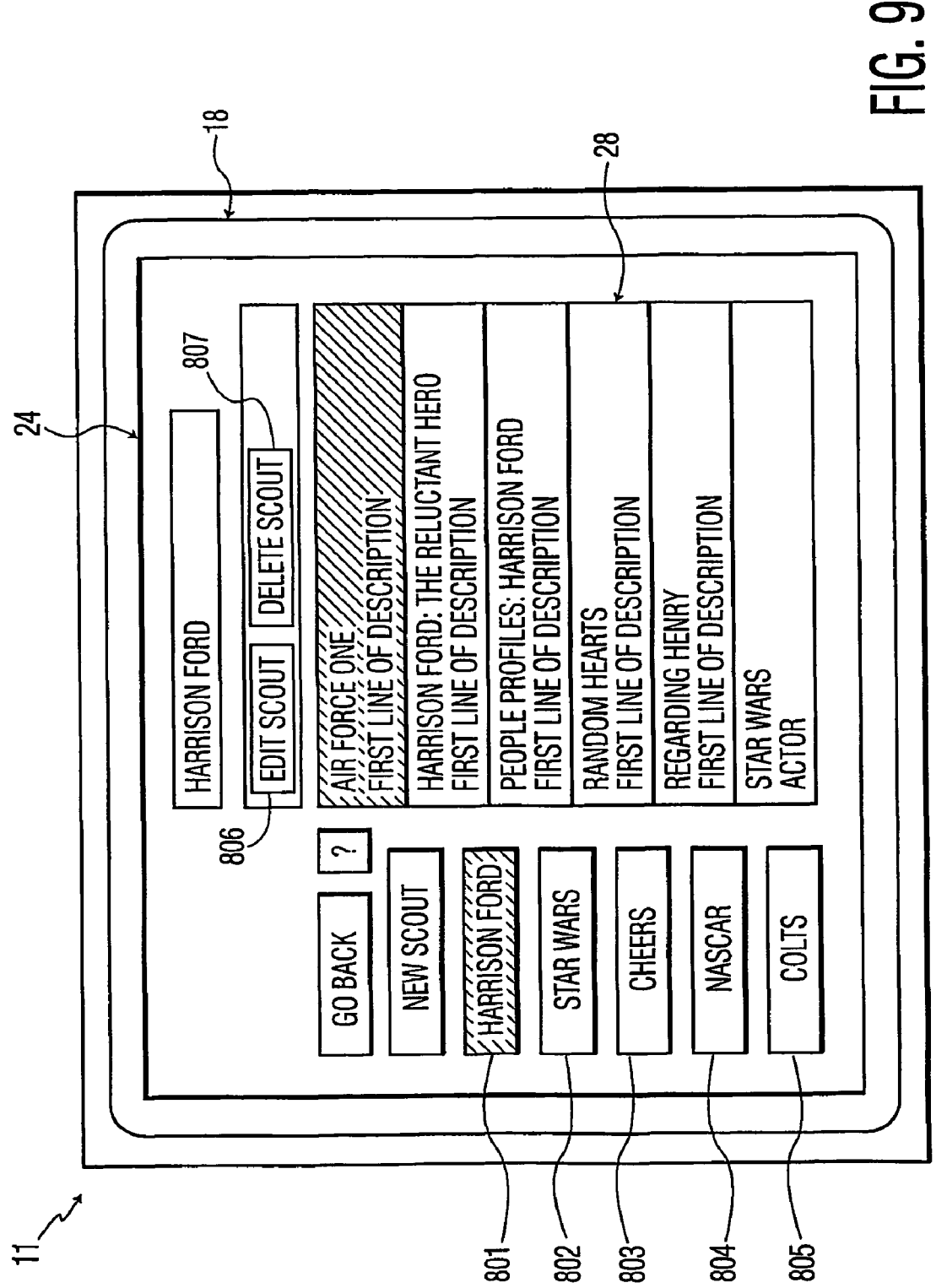
FIG. 9 is a display module having a diagrammatic representation of a Scout search results interface according to the present invention.

Referring to FIG. 9, upon system controller 115 (FIG. 2) completing its search of the program guide records for matches, Scout search result interface 24 is generated in display module 11. Scout search result interface 24 displays a list of the upcoming programs corresponding to the matching records in search result field 28. Scout search result interface 24 further comprises a list 801-805 of previously performed searches and the search results associated therewith. A search can be edited or deleted by selecting edit Scout button 806 or delete Scout button 807.

Referring to FIGS. 5 and 8, upon selecting "save as Scout" button 404, step 1040 of FIG. 10, converting the first-type criterion into second-type search criterion, is performed. When the user selects "save as Scout" button 404, the user selected text string of FIG. 5 is automatically transferred from AlphaSort text string field 401 to Scout text string field 14. Similarly, the boxes corresponding to the user selected program identification field of the AlphaSort search (i.e., the title field) is automatically checked in field selection field 16. Optionally, once the AlphaSort search criterion of AlphaSort search interface 400 is transferred into Scout search interface 12, a user can modify the converted search criterion of Scout search interface 12 by entering commands via remote control 125. As such, step 1050 of FIG. 10, modifying the second-type search criterion, can be performed. The second-type search criterion can then be saved and repetitive searches of the EPG records can be performed as discusses above, thus facilitating completion of step 1060 of FIG. 10.

The method of invention disclosed in FIG. 10 and discussed above in relation to the AlphaSort and Scout searches can also be performed with the More Details feature of EPG systems. In order to avoid redundancy, only those features that differ from converting AlphaSort search criterion to Scout search criterion will be discussed in detail. Specific reference to the steps of FIG. 10 will also be omitted to avoid redundancy.

Referring to FIG. 4, a user can highlight a program cell on the EPG grid by controlling a position indicator via remote control 125. If the user wishes to get detailed information regarding the credits of the program listed in the highlighted cell, he or she can select More Details icon 597. Upon selecting More Details icon 597, More Details credits interface 600 (FIG. 6) is displayed in display area 18 of display module 11.

Referring to FIG. 6, More Details credits interface 600 comprises credits selection buttons 601-608 and credit display field 609. Each credit selection button 601-608 corresponds to a program identification field that the data of the EPG records is divided into. By highlighting a particular credit selection button 601-608, the program identification information stored in the corresponding program identification field of that record is displayed in credit display field 609.

For example, if the program selected from the grid of FIG. 4 is the movie Shakespeare In Love, and "actors and roles" button 601 is highlighted, a list of the actors starring in Shakespeare In Love, and their roles therein, are displayed in credits display field 609. Upon highlighting and selecting a particular cell containing an actor's name in credits display field 601, a More Details search of the EPG records is performed, using the actor's name as the user selected text string. The user selected program identification fields for a More Details search are those program identification fields that correspond to the particular credit selection button 601-608 selected (in this case "actors and roles"). As with the AlphaSort search, the user selected text string and the user selected program identification fields comprise the first-type search criterion for the More Details search. The search is then conducted and the results of the one-time More Details search are displayed in More Details search result interface 700 (FIG. 7).

Figure 7:
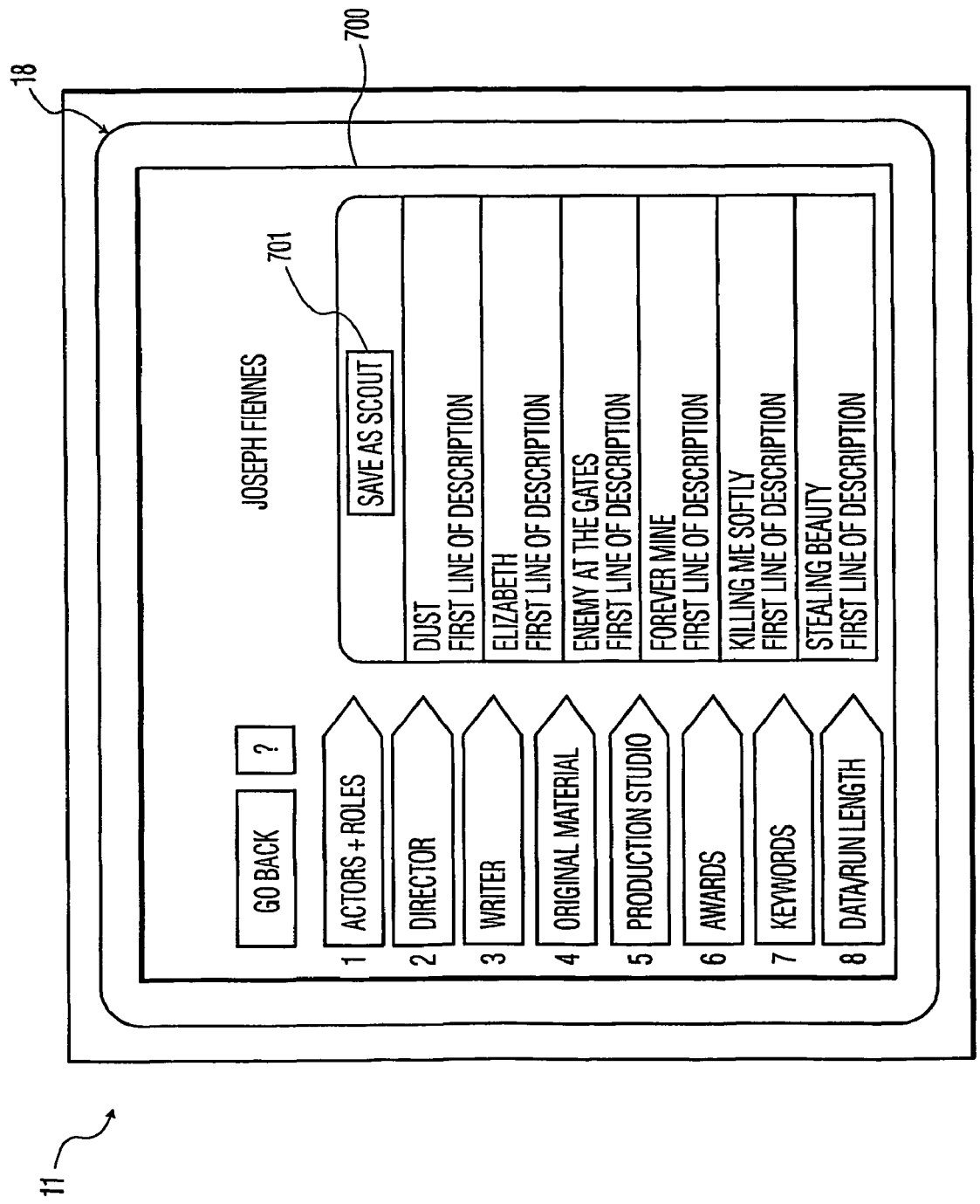
FIG. 7 is a display module having a diagrammatic representation of a More Details search results interface according to the present invention.

Referring to FIG. 7, More Details search results interface 700 comprises "save as Scout" button 701 and results field 702. As described in detail above with regard to the AlphaSort search, when a user highlights and selects "save as Scout" button 701, the first-type search criterion used to perform the More Details search are transferred to Scout search interface 12 (FIG. 8) and converted to second-type search criterion.

The foregoing discussion discloses and describes merely exemplary embodiments of the present invention. As will be understood by those familiar with the art, the invention may be embodied in other specific forms without departing from the spirit or essential characteristics thereof. Specifically, the present invention can be used to transfer search criterion between many different types of searches. Accordingly, the disclosure of the present invention is intended to be illustrative, but not limiting, of the scope of the invention, which is set forth in the following claims.

The invention claimed is:

1. A method for controlling an apparatus comprising:
   receiving and storing electronic program guide information;
   receiving a first search criterion from a user for a first type of search, the first search criterion including a user selected text string and a user selected program identification field;
   searching the electronic program guide information to find one or more records matching the first search criterion;
   receiving a user instruction via a first user interface to convert the first search criterion to a second search criterion for use with a second type of search;
   in response to the user instruction, converting the first search criterion to the second search criterion by automatically transferring the first search criterion to a second user interface for use with the second type of search, the second user Interface comprising a text string entry portion for enabling user entry of one or more individual characters of a text string one character at a time and a field selection portion including a plurality of user selectable program identification fields and having at least a title field and an actor field; and
   wherein the transferring step includes the apparatus causing the user selected text string of the first search criterion to be automatically entered into the text string entry portion of the second user interface as a pre-selected text string without requiring the user to re-enter the user selected text string of the first search criterion into the text string entry portion of the second user interface, and further includes the apparatus causing the user selected program identification field of the first search criterion to be automatically selected in the field selection portion of the second user interface as a pre-selected program identification field without requiring the user to re-select the user selected program identification field of the first search criterion in the field selection portion of the second user interface.

2. The method of claim 1 wherein the first type of search is a non-continuous search and the second type of search is a continuous search.

3. The method of claim 2 wherein the non-continuous search is an alphabetical sort search and the continuous search is a non-alphabetical sort search.

4. The method of claim 1 comprising saving the second search criterion and repetitively performing new searches based on the saved second search criterion.

5. The method of claim 4 wherein the repetitive new searches are conducted either automatically upon receipt of updated program guide information or upon user command.

6. The method of claim 1 wherein the electronic program guide information comprises periodically updated records, wherein each record comprises a plurality of program identification fields relating a program's identification information to a corresponding data field, including at least one of topic, theme, actor, title, director, awards, production studio, release date, roles, description, and keywords.

7. The method of claim 1 further comprised of allowing user modification of the second search criterion via the second user interface.

8. The method of claim 7 wherein the plurality of user selectable program identification fields includes at least one of topic, theme, actors, titles, descriptions, roles, directors, writers, production studios, awards, keywords, and release dates.

9. The method of claim 7 wherein the user selected text string is either composed by the user or delineated by the user as the text within a user interface cell.

10. The method of claim 1 further comprised of searching the electronic program guide information to find one or more records matching the second search criterion from the second user interface.

11. An apparatus for enabling a user to search electronic program guide information, comprising:
   first means for receiving a first search criterion from the user for a first type of search and searching the electronic program guide information to find one or more records matching the first search criterion, the first search criterion including a user selected text string and a user selected program identification field;
   second means for enabling display of a first user interface providing the one or more records matching the first search criterion, wherein the user provides a command via the first user interface to convert the first search criterion to a second search criterion for use with a second type of search, and the first search criterion is converted to the second search criterion responsive to the command by the first search criterion being transferred to a second user interface for use with the second type of search, the second user interface comprising a text string entry portion for enabling user entry of one or more individual characters of a text string one character at a time and a field selection portion including a plurality of user selectable program identification fields and having at least a title field and an actor field; and
   wherein the transferring step includes the apparatus causing the user selected text string of the first search criterion to be automatically entered into the text string entry portion of the second user interface as a pre-selected text string without requiring the user to re-enter the user selected text string of the first search criterion into the text string entry portion of the second user interface, and further includes the apparatus causing the user selected program identification field of the first search criterion to be automatically selected in the field selection portion of the second user interface as a pre-selected program identification field without requiring the user to re-select the user selected program identification field of the first search criterion in the field selection portion of the second user interface.

12. The apparatus of claim 11 wherein the first type of search is a non-continuous search and the second type of search is a continuous search.

13. The apparatus of claim 12 wherein the non-continuous search is an alphabetical sort search.

14. The apparatus of claim 11 wherein the second search criterion is saved and the first means repetitively performs new searches based on the saved second search criterion.

15. The apparatus of claim 14 wherein the repetitive new searches are conducted either automatically upon receipt of updated program guide information or upon user command.

16. The apparatus of claim 11 wherein the electronic program guide information comprises periodically updated records, wherein each record comprises a plurality of program identification fields relating a program's identification information to a corresponding data field, including at least one of topic, theme, actor, title, director, awards, production studio, release date, roles, description, and keywords.

17. The apparatus of claim 11 wherein the second search criterion can be modified by the user via the second user interface.

18. The apparatus of claim 17 wherein the plurality of user selectable program identification fields includes at least one of topic, theme, actors, titles, descriptions, roles, directors, writers, production studios, awards, keywords, and release dates.

19. The apparatus of claim 17 wherein the user selected text string is either composed by the user or delineated by the user as the text within a user interface cell.

20. The apparatus of claim 11 further comprised of the first means searching the electronic program guide information to find one or more records matching the second search criterion from the second user interface.

* * * * *